United States Patent [19]

Miller

[11] 4,161,020

[45] Jul. 10, 1979

[54] FLUORESCENT LAMPHOLDER ASSEMBLY FOR CIRCLINE LAMP

[75] Inventor: Jack V. Miller, Sierra Madre, Calif.

[73] Assignee: Killerwatt Corporation, Los Angeles, Calif.

[21] Appl. No.: 864,317

[22] Filed: Dec. 27, 1977

Related U.S. Application Data

[63] Continuation-in-part of Ser. No. 770,753, Feb. 22, 1977, abandoned, which is a continuation-in-part of Ser. No. 734,263, Oct. 20, 1976, abandoned, and Ser. No. 734,264, Oct. 20, 1976, abandoned.

[51] Int. Cl.² ............................................. F21S 5/00
[52] U.S. Cl. .................................. 362/216; 362/225; 362/362
[58] Field of Search ........ 362/216, 225, 362, 374–375; 339/50 C

[56] References Cited

U.S. PATENT DOCUMENTS

| | | | |
|---|---|---|---|
| 2,288,941 | 7/1942 | Curtis | 362/375 |
| 2,472,597 | 6/1949 | Levy | 362/216 |
| 2,480,301 | 8/1949 | Moretz | 362/216 |
| 2,688,690 | 9/1954 | Lane | 362/216 |
| 2,924,702 | 2/1960 | Block | 362/375 |
| 2,943,238 | 6/1960 | Reaves | 362/216 X |
| 3,168,987 | 2/1965 | Heisler | 339/99 R X |
| 3,742,208 | 6/1973 | Mills | 362/216 |

*Primary Examiner*—Peter A. Nelson
*Attorney, Agent, or Firm*—Christie, Parker & Hale

[57] ABSTRACT

A lampholder-socket is attached to a housing having a smaller cross section than a circline lamp. The housing is preferably block-shaped, having four edges parallel to the axis of the circline lamp when installed. The diagonal distance between the edges is almost as large as the diameter of the circline lamp. The lampholder-socket extends partially inside the housing and partially outside the housing. Its terminals are adapted at one end to engage the circline lamp pins outside the housing when the circline lamp surrounds the housing and are adapted at the other end to receive connecting wires of components inside the housing, preferably with a poke home connection. A support, preferably a pair of stationary fingers extending from the housing at points spaced from each other and from the lampholder-socket, hold the circline lamp in place together with the lampholder-socket when the pins of the circline lamp engage the terminals.

37 Claims, 12 Drawing Figures

Fig. 2

Fig. 3

FLUORESCENT LAMPHOLDER ASSEMBLY FOR CIRCLINE LAMP

CROSS REFERENCE TO RELATED APPLICATIONS

This application is a continuation-in-part of my copending application, Ser. No. 770,753, filed Feb. 22, 1977, which is a continuation-in-part of my applications, Ser. No. 734,263 and Ser. No. 734,264, filed Oct. 20, 1976, all now abandoned.

BACKGROUND OF THE INVENTION

This invention relates to lighting fixtures, and more particularly, to a fluorescent lampholder assembly for receiving a circline lamp.

A circline lamp is a ring-shaped fluorescent lighting device having a single plug and two electrodes located together in one region of the ring. Due to its efficient use of space, a circline lamp can be used in lighting fixtures designed for incandescent lamps, whereas the more conventional straight, elongated fluorescent lamp requires a specially designed fixture.

A fluorescent lighting device uses components, namely a ballast and a starter switch not required for an incandescent lamp. In the case of a circline lamp, these components are usually packaged in a housing located within the perimeter of the ring-shaped lamp. A lampholder-socket located outside the housing engages the plug pins of the circline lamp. Wires connect the lampholder-socket to the components within the housing. A plurality of supports located at spaced intervals around the housing hold the circline lamp in place. In one prior art design, the lampholder-socket is mounted in the support outside the housing.

SUMMARY OF THE INVENTION

According to one feature of the invention, a fluorescent lampholder assembly for a circline lamp has a lampholder-socket attached to a housing. The lampholder-socket extends partially inside the housing and partially outside the housing. Its terminals are adapted at one end to engage the plug pins of the circline lamp outside the housing when the circline lamp surrounds the housing and are adapted at the other end to receive the connecting wires of components inside the housing. Consequently, no wiring is located outside the housing.

Another feature of the invention is a stationary support preferably one or more fingers spaced from each other and the lampholder-socket around the housing, to hold the circline lamp in place together with the lampholder-socket when the pins of the circline lamp engage the terminals. Thus, there is a simple completely stationary support system for the circline lamp which utilizes the engagement between the lampholder-socket and the plug pins of the circline lamp to support in part the circline lamp.

Another feature of the invention is a hexehedral, block-shaped housing having four edges that are preferably parallel to the axis of the circline lamp when installed. The diagonal distance between the edges is almost as large as the diameter of the circline lamp so as to keep the circline lamp in a plane transverse to its axis when the circline lamp surrounds the housing. As a result, the size and shape of the housing help to maintain the circline lamp in the proper position.

BRIEF DESCRIPTION OF THE DRAWINGS

The features of specific embodiments of the best mode contemplated of carrying out the invention are illustrated in the drawings in which.

DETAILED DESCRIPTION OF THE SPECIFIC EMBODIMENTS

Figure 1:
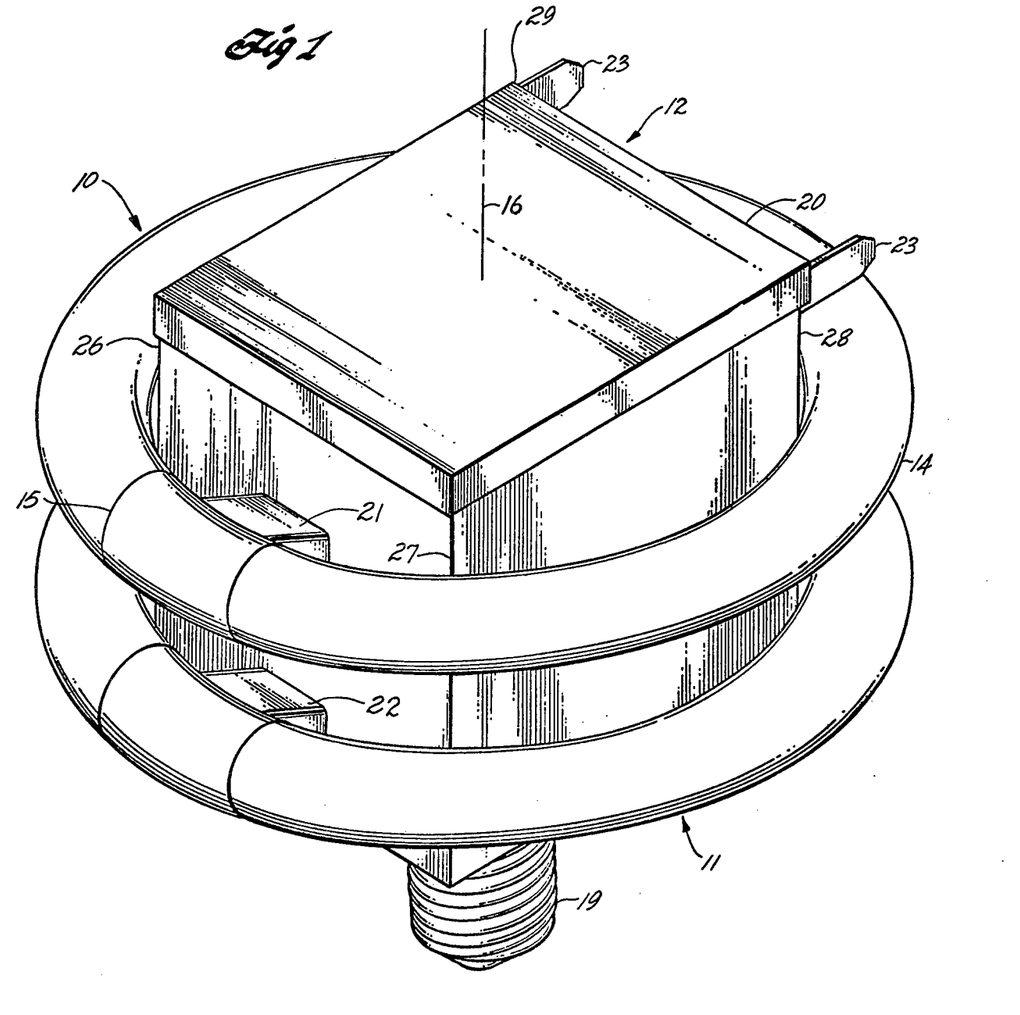
FIG. 1 is a perspective view of one embodiment of a fluorescent lampholder assembly for a circline lamp incorporating principles of the invention.
Figure 2:
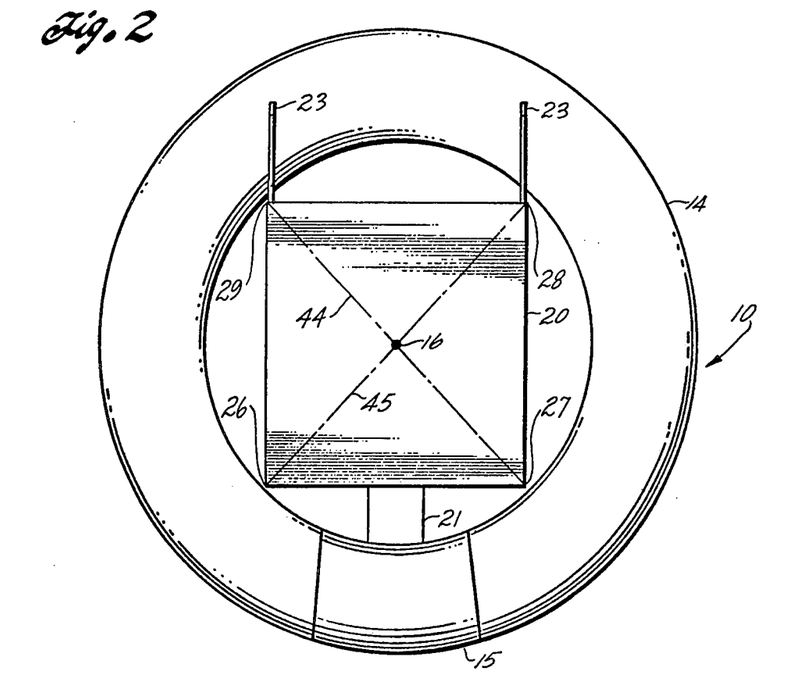
FIG. 2 is a top plan view of the lampholder assembly of FIG. 1.
Figure 3:
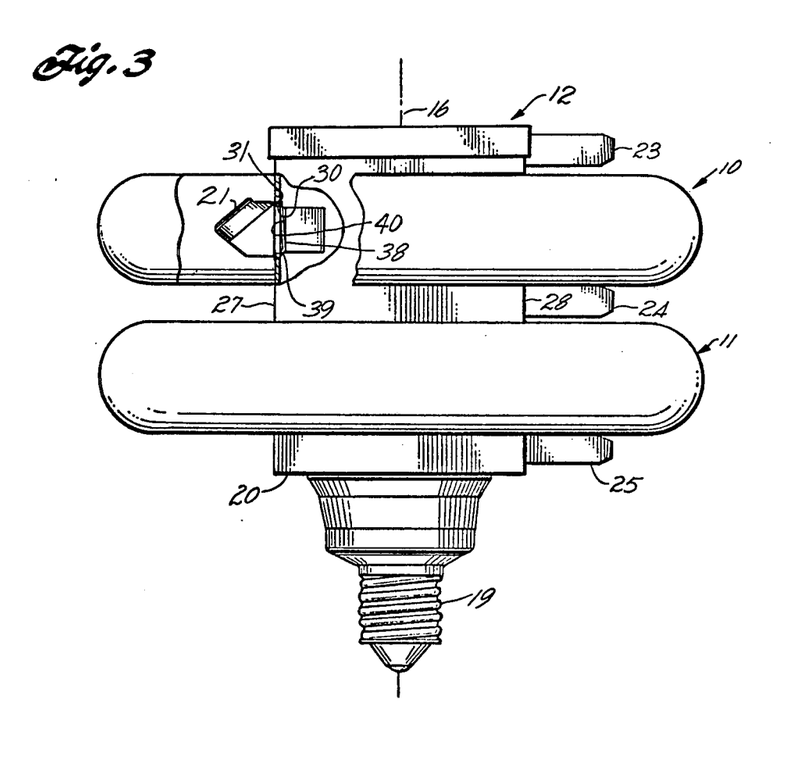
FIG. 3 is a side elevation view of the lampholder assembly of FIG. 1.

In FIGS. 1, 2, and 3 are shown circline lamps 10 and 11 and a lampholder assembly 12 for receiving circline lamps 10 and 11. Lampholder assembly 12 functions as a circline lamp adapter for incandescent lamp fixtures. As illustrated in the drawings, circline lamps 10 and 11 are ring-shaped fluorescent lighting devices. Each lighting device includes a glass tube 14 forming most of the perimeter of the ring and a metal sleeve 15 forming the remainder of the perimeter. The electrodes and the plug pins for the fluorescent lighting device (not shown) are located in sleeve 15. The axis of circline lamps 10 and 11 is represented by an imaginary line 16 in the drawings. There are four plug pins extending inwardly and approximately at a 45° angle to the plane perpendicular to axis 16. The pins are arranged two by two, two pins being connected to each electrode. Circline lamps 10 and 11 are standard commercial products.

Lampholder assembly 12 comprises a conventional screw base 19, a hexahedral block-shaped housing 20, lampholder-sockets 21 and 22 attached to housing 20, and pairs of fingers 23, 24, and 25 which serve as stationary supports. Housing 20 has edges 26, 27, 28, and 29, which are parallel to axis 16, when circline lamps 10 and 11 are installed as shown in the drawings.

One of each pair of fingers 23, 24, and 25 is located at edge 28 of housing 20, and the other of each pair of fingers 23, 24, and 25 is located at edge 29 of housing 20. Screw base 19, which extends from the bottom of housing 20, screws into a conventional incandescent lamp socket.

Figure 3A:
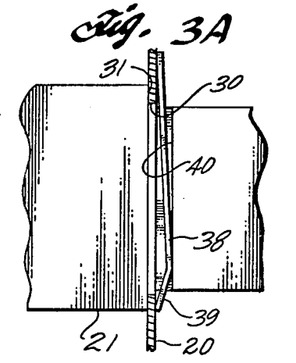
FIG. 3A is an enlargement of part of FIG. 3.
Figure 3B:
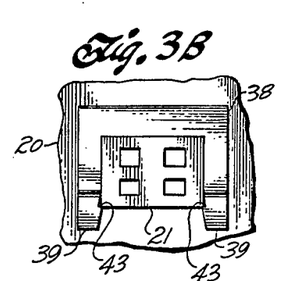
FIG. 3B is a back view of the enlargement shown in FIG. 3A from inside the lampholder assembly.

Lampholder-sockets 21 and 22 are mounted on housing 20 between edges 26 and 27. As illustrated for lampholder-socket 21 in FIG. 3, each lampholder-socket passes through a hole 30 in the side of housing 20 so as to lie partially inside housing 20 and partially outside housing 20; the portion of the lampholder-socket extending outside housing 20 has a shoulder 31 that abuts the outer surface of housing 20 around hole 30. A U-shaped spring clip 38 (FIG. 3B) having ends 39 bent toward the inside surface of housing 20 fit in grooves 40 in the sides of the portion of the lampholder-socket extending inside housing 20 (FIG. 3A). Ends 39 have retaining barbs 43. When spring clip 38 is in place in grooves 40, spring clip 38 embraces the lampholder-socket, barbs 43 lock spring clip 38 in place in grooves 40, and ends 39 are deflected, thereby exerting a force against the inside surface of housing 20 and against the opposite surface of groove 40. Thus, the lampholder-socket is held in fixed position in hole 30 because the side wall of housing 20 is clamped between spring clip 38 and hole 30.

As discussed in more detail below, lampholder-sockets 21 and 22 each have four terminals arranged two by two and adapted at the end outside housing 20 to receive the plug pins of a circline lamp. Thus, these terminals have channels that are oriented at an angle of between 40° and 50° to a plane perpendicular to edges 26 through 29 of housing 20.

To install circline lamp 10, the side opposite sleeve 15 is first placed between pairs of fingers 23 and 24 while the side with sleeve 15 is tipped upwardly, as viewed in FIG. 1, away from housing 20. Then, the side of circline lamp 10 with sleeve 15 is rotated downwardly until its plug pins are aligned with the terminals of lampholder-socket 21, at which time sleeve 15 is pushed toward lampholder-socket 21 to engage the plug pins of circline lamp 10 with the terminals of lampholder-socket 21 and to place circline lamp 10 in its installed, operating position as shown in FIGS. 1, 2, and 3. Circline lamp 11 is installed in the same manner, before circline lamp 10. When so installed, circline lamps 10 and 11 are held firmly in place and supported by their respective lampholder-sockets and pairs of fingers. With screw base 19 screwed into an upwardly opening incandescent lamp screw socket, lampholder assembly 12 and circline lamps 10 and 11 are oriented as shown in FIGS. 1, 2, and 3, circline lamp 10 rests on pairs of fingers 24, and circline lamp 11 rests on pairs of fingers 25; pairs of fingers 23 and 24 serve to prevent accidental sideward twisting of circline lamps 10 and 11, respectively, which might cause lamp damage. With screw base 19 screwed into a downwardly opening incandescent lamp screw socket such as is found on a ceiling fixture, the role of pairs of fingers 23, 24, and 25 is reversed; circline lamps 10 and 11 rest on pairs of fingers 23 and 24, respectively, pair of fingers 24 limits sideward twisting of circline lamp 10, and pair of fingers 25 limits sideward twisting of circline lamp 11. In either mounting alternative, circline lamp 10 is closely bracketed by pairs of fingers 23 and 24, and circline lamp 11 is closely bracketed by pairs of fingers 24 and 25.

As illustrated in FIG. 2 by imaginary diagonal lines 44 and 45, the diagonal distances between edges 27 and 29 and between edges 26 and 28, respectively, are almost as large, e.g., $3\frac{3}{4}$ inches, as the diameter of circline lamps 10 and 11. Consequently, edges 26 through 29 of housing 20 keep circline lamps 10 and 11 in a plane transverse, i.e., approximately perpendicular, to axis 16 when circline lamps 10 and 11 are installed. This also reduces the risk of lamp damage, particularly to the plug pins.

Figure 4:
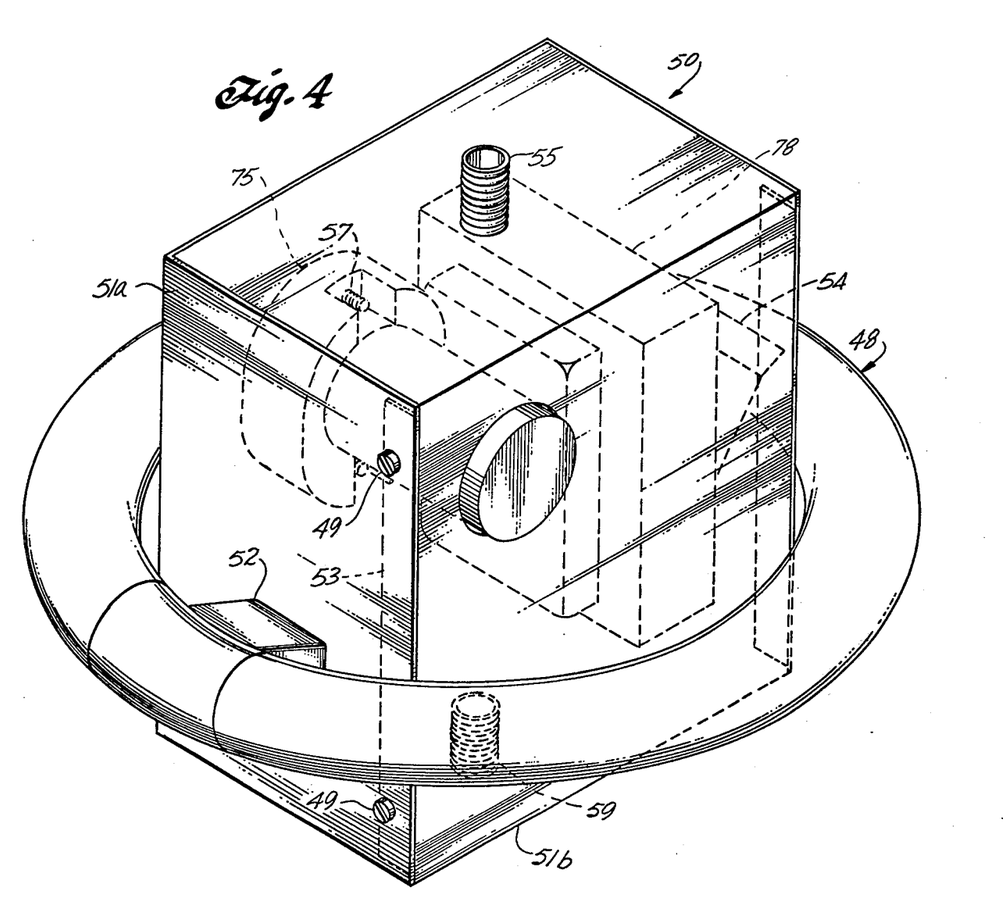
FIG. 4 is a perspective view of another embodiment of a fluorescent lampholder assembly incorporating the principles of the invention.
Figure 5:
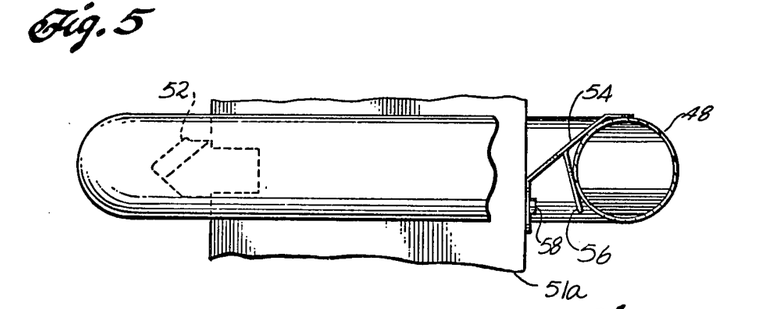
FIG. 5 is a side elevation view of part of the lampholder assembly of FIG. 4.
Figure 6:
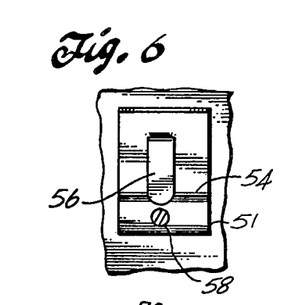
FIG. 6 is an end elevation view of part of the lampholder assembly of FIG. 4.

Reference is made to FIGS. 4, 5, and 6 for another embodiment of a fluorescent lampholder assembly for a circline lamp. A circline lamp 48 is installed in a lampholder assembly 50, which has a hexahedral block-shaped housing comprising three-sided, generally U-shaped panels 51a and 51b that are fitted together so the sides of each panel cover the open ends of the other panel, thereby forming an enclosure. The center of panel 51b has flanges 53 to which the sides of panel 51a are secured by screws 49. As shown in FIG. 4, the center portion of each of panels 51a and 51b is longer than the end portions thereof. As a result, the housing has two wide vertical side faces and two narrow vertical side faces. Panel 51a has a lampholder-socket 52 on one end surface and a spring clamp 54 with a tongue 56 on the opposite end surface. As shown in FIG. 5, spring clamp 54 has a first portion parallel to the surface of panel 51a, a second portion extending away from the first portion and panel 51a at an acute angle to the surface of panel 51a, and a third portion extending perpendicularly away from panel 51a at the end of the second portion opposite the first portion. Tongue 56 extends away from the second portion at an angle approximately larger than 90° to form a crutch in which circline lamp 48 lies when in position. A threaded sleeve 55 on the top side surface of panel 51b serves as fitting for attachment of a lampshade. A threaded sleeve 59 on the bottom side surface of panel 51b serves as a fitting for attachment of the lampholder assembly to the base of a table lamp (not shown). The electrical wiring enters the housing through sleeve 59. Circline lamp 48 is installed in a manner similar to circline lamps 10 and 11 in FIGS. 1, 2, and 3. Specifically, the side of the lamp opposite the plug pins is placed in the clamp with the lamp tipped upwardly, as viewed in FIG. 4, and the side of the lamp with the plug pins is then rotated until the pins of the plug are aligned with the terminals of the lampholder-socket. During this procedure, tongue 56 of clamp 54 is deflected somewhat toward the housing. Then, the side of the lamp with the plug pins is pushed toward the housing to engage the plug pins with the terminals of the lampholder-socket and to place the lamp in its installed, operating position. When in this position, tongue 56 of the clamp is still deflected somewhat toward the housing, thereby exerting a slight force on the plug of the lamp toward lampholder-socket 52. Thus, the lampholder-socket and clamp firmly hold the circline lamp in operating position shown in FIGS. 4, 5, and 6. This embodiment relies upon the deflection of the clamp to keep the circline lamp in a plane transverse to its axis rather than a housing having diagonal corners almost as large as the diameter of the circline lamp. The embodiment of FIGS. 1, 2, and 3 has the advantages over this embodiment of having a simpler lamp support system and one that exerts no forces on the lamp.

Figures 7, 8:
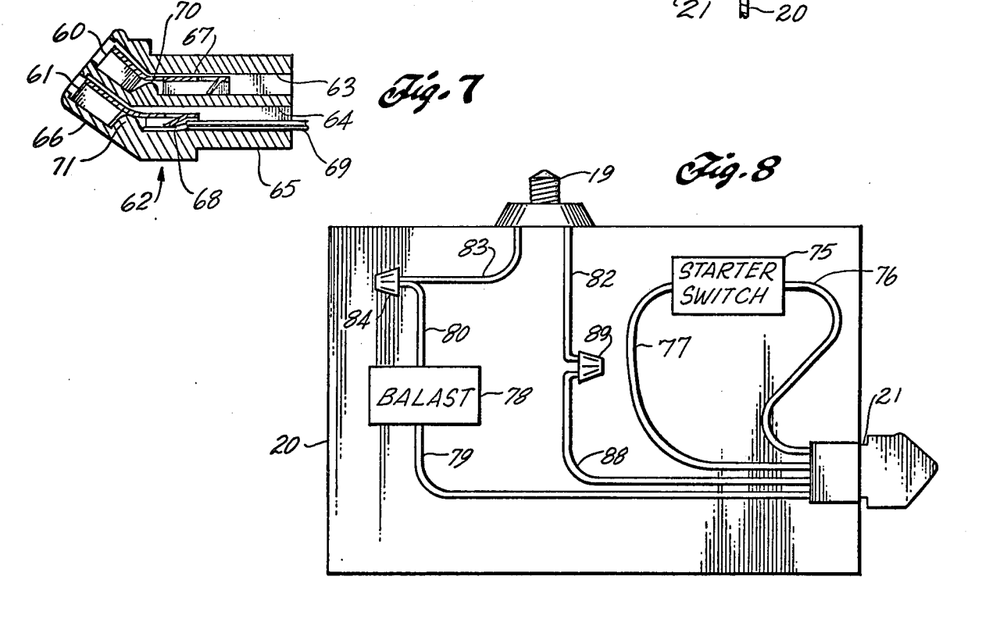
FIG. 7 is a side sectional view of the lampholder-socket in the embodiments of FIGS. 1 and 4.
FIG. 8 is a schematic diagram of the components inside the housing in the embodiments of FIGS. 1 and 4.

In FIG. 7 one of the lampholder-sockets is shown in section, taken through two of the four electrically conductive terminals, designated 60 and 61. The lampholder-socket has a molded, electrically insulative thermoplastic body 62 through which passages 63 and 64 extend from end to end. As shown, body 62 is doglegged, having a portion 65 and a portion 66 that meet at an obtuse angle. This permits portion 65 of the lampholder-socket to be attached to the housing by clip 38 in the manner described above in FIG. 3, while the ends of the terminals outside the housing are oriented to receive the slanting plug pins of the circline lamp. Terminal 60 lies in passage 63 and terminal 61 lies in passage 64. Terminals 60 and 61 each have a first channel with a generally U-shaped cross section opening toward the outside of housing 20, a second channel with a generally U-shaped cross-section opening toward the inside of housing 20, and a bent strip connecting the first and second channels. The first channel has sides spaced so as to grip and engage a plug pin inserted therein. The center of the second channel has a flap, designated 67 in the case of terminal 60 and 68 in the case of terminal 61, which is longer than the depth of the passage (63 or 64). The flap extends completely across or almost completely across the passage, slanted in the direction of the first channel. When a wire is inserted in the second channel beyond the flap, as illustrated by wire 69 inserted in the second channel of terminal 61, it becomes wedged between the end of the flap and the opposite surface of passage 64. Thus, an electrical connection is made from wire 69 through flap 68 and the body of terminal 61 to a circline lamp plug pin inserted in the first channel. When wire 69 is pulled, flap 68 is also pulled, thereby wedging wire 69 even more tightly between the opposite surface of passage 64 and the end of flap 68, thereby preventing its removal therefrom. Because the flaps are longer than the depth of the passages, they can not be pulled, until the flaps slant away from the first channel without causing permanent damage to the terminal. In summary, flap 68 forms a permanent connection with the inserted wire called poke home connection. The term "poke home connection" is used in this specification to mean a permanent electrical and mechanical connection that is made by insertion of wire into a terminal without more, i.e. without use of solder, wire nut, etc. Protrusions 70 and 71 lie in passages 63 and 64, respectively, between the sides of the first and second channels to retain the terminals in their respective passages as the terminals are subjected to pulling and pushing forces. Reference is made to my application entitled, "Circline Fluorescent Lampholder-Socket," filed contemporaneously herewith, and now U.S. Pat. No. 4,105,276 for a more detailed description of the construction of the lampholder-sockets. This application is incorporated herein by reference.

FIG. 8 is a schematic diagram of the components and wiring inside housing 20. A starter switch 75 in the form of a glow lamp has wires 76 and 77 that make poke-home connections in lampholder-socket 21 with the terminals leading to a first terminal of the first and second electrodes of the circline lamp, respectively. A ballast 78 in the form of a coil, which prevents damage to the circline lamp during turn-on, has wires 79 and 80. Wire 79 makes a poke-home connection in lampholder-socket 21 with the terminal leading to the second terminal of the first electrode of the circline lamp. Fitting 19 or a plug, which is plugged into a conventional electrical outlet outside housing 20, has wires 82 and 83 leading into housing 20. A wire nut 84 is used to make an electrical connection between wires 80 and 83. A wire 88 makes a poke-home connection in lampholder-socket 21 with the terminal leading to the second terminal of the second electrode of the circline lamp. A wire nut 89 is used to make an electrical connection between wires 82 and 88. (Alternatively, wire 88 and wire nut 89 could be eliminated if desired by a direct poke-home connection of wire 82 in lampholder-socket 21.) All of the described wires have insulation which is stripped at the point of connection.

Most advantageously, in the embodiment of FIGS. 4 through 6, starter switch 75 and ballast 78 are mounted on panel 51a, as illustrated by hidden lines in FIG. 4. Starter switch 75, which is exposed to the exterior of the housing for ease of replacement, is secured to panel 51a by screws 57. Ballast 78 is secured to panel 51a by screws 58, one of which also serves to mount clamp 54 on panel 51a. As a result, during manufacture, panel 51a, including lampholder-socket 52, starter switch 75, ballast 78, and associated wires, is put together in a separate electrical parts assembly operation on one assembly line, while panel 51b is attached to the base of the table lamp in a separate mechanical parts assembly operation on another assembly line, where the table lamps are put together. Finally, panels 51a and 51b are put together where the assembly lines merge by the two-step operation of first connecting wires 80 and 83 with wire nut 84, and wires 82 and 88 with wire nut 89, and then securing panels 51a and 51b with screws 49.

Figure 9:
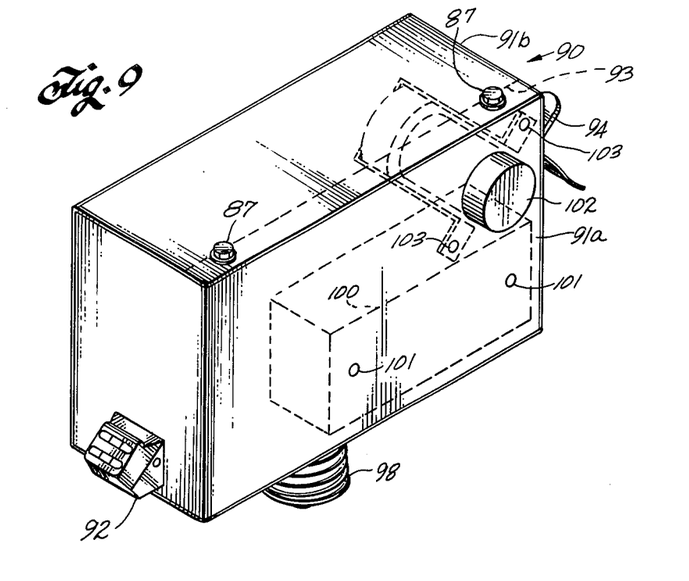
FIG. 9 is a perspective view from the top and side of another embodiment of a fluorescent lampholder assembly incorporating the principles of the invention.
Figure 10:
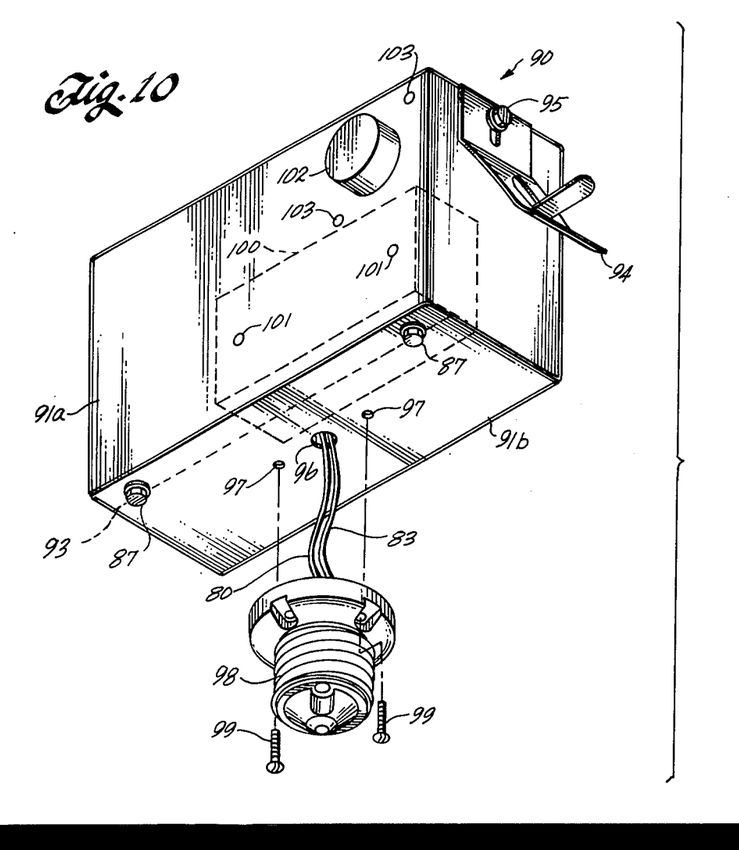
FIG. 10 is a perspective view from the bottom and side of the embodiment of FIG. 9.

Reference is made to FIGS. 9 and 10 for another embodiment of a fluorescent lampholder assembly for a circline lamp, which functions as an adapter for an incandescent lamp fixture. This embodiment is similar to that shown in FIGS. 4, 5, and 6—the principal differences being as follows: a screw base instead of a fitting sleeve; panel securing flanges on the other panel; and a different mounting bracket for the starter switch socket. To facilitate illustration of the lampholder assembly, the circline lamp is not shown. A lampholder assembly 90 has a hexahedral, block-shaped housing comprising three-sided, generally U-shaped panels 91a and 91b that are fitted together so that the sides of each panel cover the open ends of the other panel, thereby forming an enclosure. The center of panel 91a has edge flanges 93 to which the sides of panel 91b are secured by screws 87 passing through registering screw holes in the sides of panel 91b and flanges 93. A lampholder socket 92 is mounted on one end, i.e., side surface of panel 91a in the manner described above in connection with FIGS. 3A and 3B. A spring clamp 94, identical to spring clamp 54, is mounted on the opposite end, i.e., side surface of panel 91a by means of a screw 95. One end, i.e., the bottom surface of panel 91b, as viewed in FIGS. 9 and 10, has a central wire access hole 96 and a pair of smaller screw holes 97 on either side of central hole 96. A pair of insulated wires (i.e., wires 82 and 83 in FIG. 8) which are electrically connected at one end to a conventional screw base 98, pass through central hole 96 to the interior of the housing, where they are electrically connected to the lamp starting circuitry, as shown in FIG. 8. Screw base 98 is secured to panel 91b by a pair of screws 99, which are screwed into holes 97. (To facilitate illustration of holes 96 and 97, FIG. 10 is exploded as to screw base 98.) A ballast 100 is attached to the center of panel 91a by rivets 101, and a starter switch 102 is secured to the center of panel 91a by rivets 103, which hold brackets 104 that support a socket 105 for starter switch 102 in spaced relationship from the surface of panel 91a.

Lampholder assembly 90 is assembled in the same manner described above in connection with the embodiment of FIGS. 4 through 6. Specifically, socket 92, clamp 94, ballast 100, and starter switch 102 with bracket 104 and socket 105 are mounted on panel 91a and electrically connected together, as shown in FIG. 8, on one assembly line, while screw base 98 is mounted on panel 91b on a different assembly line. Finally, panels 91a and 91b are put together where the assembly lines merge by the two step operation of first connecting the wires from screw base 98, i.e., wires 80 and 83, with wire nuts and then securing panels 91a and 91b with screws 87.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention as set forth in the following claims. For example, although it is preferred to practice all of the described features of the invention, in some cases it may be advantageous to practice only one or less than all of the features. The edges of the housing do not have to be parallel to prevent lateral twisting of the circline lamp when installed—they could converge somewhat. Also, the embodiment of FIG. 4 could have a screw base instead of a sleeve or the embodiment of FIG. 1 could have a sleeve instead of a screw base, depending upon whether a retrofit assembly or an original equipment assembly is desired. The embodiment of FIG. 4 could be modified to handle two circline lamps by providing a longer housing and another lampholder-socket 52 and clamp 54.

What is claimed is:

1. A fluorescent lampholder assembly for receiving a circline lamp comprising:
   a block-shaped housing having a smaller cross section than the circline lamp, the housing having four edges parallel to the axis of the circline lamp when installed, the diagonal distance between the edges being almost as large as the diameter of the circline lamp;
   a lampholder-socket having a first portion lying inside the housing, a second portion lying outside the housing, and terminals extending through the first and second portions, the terminals being adapted to engage the plug pins of the circline lamp outside the housing when the circline lamp surrounds the housing and being adapted to receive connecting wires of components inside the housing; and
   means extending from the housing in spaced relationship from the lampholder-socket for supporting the circline lamp together with the lampholder-socket when the pins of the circline lamp engage the terminals.

2. The lampholder assembly of claim 1, in which the housing has a side wall with a hole through which the lampholder-socket passes and the lampholder-socket is attached to the side wall of the housing adjacent to the hole.

3. The lampholder assembly of claim 2, in which the terminals have poke-home connection means to receive connecting wires.

4. The lampholder assembly of claim 3, in which the housing is hexehedral.

5. The lampholder assembly of claim 4, in which the lampholder-socket is between two adjacent edges of the housing.

6. The lampholder assembly of claim 5, in which the supporting means is stationary.

7. The lampholder assembly of claim 6, in which the supporting means comprises a pair of fingers spaced from each other, respectively, at or near the other two edges of the housing.

8. The lampholder assembly of claim 7, in which the supporting means additionally comprises a further pair of fingers spaced from each other at or near the other two edges of the housing and spaced from the first mentioned pair of fingers such that the circline lamp when installed is closely bracketed by the two pairs of fingers.

9. The lampholder assembly of claim 8, additionally comprising a threaded fitting adapted to be screwed into a standard incandescent lamp socket, the fitting extending from the housing in a direction parallel to the edges of the housing.

10. The lampholder assembly of claim 1, in which the terminals have poke-home connection means to receive connecting wires.

11. The lampholder assembly of claim 1, in which the housing is hexehedral.

12. The lampholder assembly of claim 1, in which the housing is block-shaped and has four edges parallel to the axis of the circline lamp when installed, the diagonal distance between the edges being almost as large as the diameter of the circline lamp.

13. The lampholder assembly of claim 12, in which the lampholder-socket is between two adjacent edges of the housing.

14. The lampholder assembly of claim 13, in which the supporting means comprises a pair of fingers spaced from each other respectively, at or near the other two edges of the housing.

15. The lampholder assembly of claim 14, in which the supporting means additionally comprises a further pair of fingers spaced from each other at or near the other two edges of the housing and spaced from the first mentioned pair of fingers such that the circline lamp when installed is closely bracketed by the two pairs of fingers.

16. The lampholder assembly of claim 15, additionally comprising a threaded fitting adapted to be screwed into a standard incandescent lamp socket, the fitting extending from the housing in a direction parallel to the edges of the housing.

17. The lampholder assembly of claim 1, in which the supporting means is stationary.

18. The lampholder assembly of claim 1, in which the housing has a hole through which the lampholder-socket passes and the lampholder-socket has a shoulder between the first and second portions that abuts the outside of the housing around the hole, the assembly further comprising a spring clip embracing the lampholder-socket inside the housing such that the housing is clamped between the shoulder of the lampholder-socket and the spring clip.

19. The lampholder assembly of claim 18, in which the lampholder-socket has a pair of grooves inside the housing into which the spring clip fits and the ends of the spring clip are bent toward the shoulder so as to be deflected, thereby exerting a force against the inside of the housing and the grooves.

20. The lampholder-socket of claim 19, in which the ends of the spring clip have barbs that lock the spring clip in place in the pair of grooves.

21. The lampholder assembly of claim 1, in which the housing comprises first and second three-sided, generally U-shaped panels fitted together so the sides of each panel cover the open ends of the other panel, thereby forming an enclosure in the housing, and means for securing the first and second panels together.

22. The lampholder assembly of claim 21, additionally comprising a ballast and a starter switch mounted on the first panel within the enclosure, the lampholder-socket and the supporting means being mounted on the first panel outside the enclosure, and means for mounting the lampholder assembly extending from the second panel outside the enclosure.

23. The lampholder assembly of claim 1, additionally comprising a second lampholder-socket mounted on the housing under the first mentioned lampholder-socket, the second lampholder socket having terminals adapted to engage the plug pins of a second circline lamp when the second circline lamp surrounds the housing, and second means extending from the housing in spaced relationship from the second lampholder-socket for supporting the second circline lamp together with the second lampholder-socket when the pins of the second circline lamp engage the terminals.

24. The lampholder assembly of claim 22, in which the means for mounting the lampholder assembly comprises a threaded base fitting.

25. The lampholder assembly of claim 1, in which the lamp supporting means supports the circline lamp in a given plane, the first portion of the lampholder-socket extends inwardly from the housing approximately parallel to the given plane, and the second portion of the lampholder-socket extends outwardly from the housing at an angle approximately between 40° and 50° to the given plane.

26. The lampholder assembly of claim 25, in which the terminals lie in passages extending through a first portion of the lampholder-socket approximately parallel to the given plane, and extending through the second portion of the lampholder-socket approximately at an angle of 40° to 50° to the given plane.

27. The lampholder assembly of claim 26, in which the housing has a thin side wall with a hole through which the lampholder-socket passes, the assembly additionally comprising means for attaching the lampholder-socket at the intersection of the first and second portions to the side wall adjacent to the hole.

28. The lampholder assembly of claim 27, in which the lampholder-socket has a molded electrically insulative thermoplastic body.

29. The lampholder assembly of claim 22, in which a portion of the starter switch extends through an opening in the second panel to expose the starter switch to the exterior of the housing for replacement.

30. A fluorescent lampholder assembly for receiving a circline lamp in a given plane comprising:
a block-shaped housing having first and second parallel side faces, and third and fourth parallel side faces perpendicular to the first and second side faces, the side faces forming four edges perpendicular to the given plane;
a lampholder-socket having terminals adapted to engage the plug ends of the circline lamp when the circline lamp surrounds the housing in the given plane;
means for supporting the lampholder-socket near the center of the first side face of the housing to receive the plug ends of the circline lamp when the circline lamp surrounds the housing in the given plane; and
means extending from the second side face of the housing for supporting the circline lamp in the given plane with the circline lamp surrounding the housing.

31. The lampholder assembly of claim 30, additionally comprising a starter switch mounted inside the housing between two adjacent edges and an opening in the housing between the other two edges through which a portion of the starter switch extends to expose the starter switch to the exterior of the housing for replacement.

32. The lampholder assembly of claim 30, in which the lamp supporting means is mounted on the housing near the middle of the second side face.

33. The lampholder assembly of claim 32, in which the lamp supporting means comprises a spring clamp having a first portion attached to the housing, a second portion extending away from the first portion to form an acute angle with the surface of the housing, and a tongue extending away from the second portion and the housing at an angle approximately larger than 90° to form with the second portion a crutch in which the circline lamp lies when in position, the spring clamp being deflected when the circline lamp is in place, thereby exerting a force on the pins of the circline lamp toward the lampholder-socket.

34. The lampholder assembly of claim 33, in which the spring clamp additionally comprises a third portion extending away from the housing at the end of the second portion opposite the first portion perpendicular to the surface of the housing.

35. The lampholder assembly of claim 34, in which the first and second side faces are narrower than the third and fourth side faces.

36. The lampholder assembly of claim 30, in which the housing comprises first and second three-sided, generally U-shaped panels fitted together so the sides of each panel cover the open ends of the other panel, thereby forming an enclosure in the housing, and means for securing the first and second panels together.

37. The lampholder assembly of claim 36, additionally comprising a ballast and a starter switch mounted on the first panel within the enclosure, the lampholder-socket and the supporting means being mounted on the first panel outside the enclosure, and means for mounting the lampholder assembly extending from the second panel outside the enclosure.

* * * * *